June 12, 1928. 1,673,378
F. SUNDAY
BELT CONNECTER
Filed Oct. 7, 1927
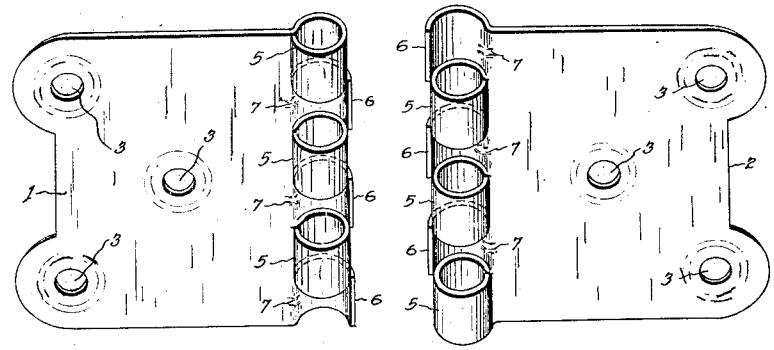
Fig. 1.
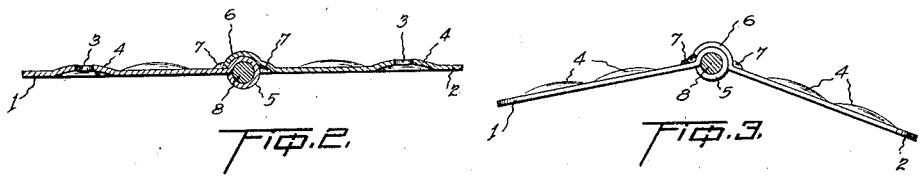
Fig. 2.
Fig. 3.
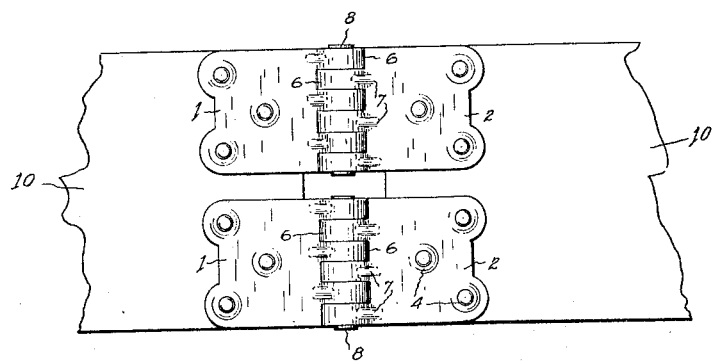
Fig. 4.
Inventor
Frank Sunday
By
Attorney Patented June 12, 1928.

1,673,378

UNITED STATES PATENT OFFICE.

FRANK SUNDAY, OF DETROIT, MICHIGAN, ASSIGNOR OF ONE-HALF TO MATTHEW L. FINN, OF DETROIT, MICHIGAN.

BELT CONNECTER.

Application filed October 7, 1927. Serial No. 224,581.

This invention relates to devices for flexibly connecting the ends of power transmission belts, and its object is to provide a simple and cheaply constructed device for the purpose adapted to be formed from sheet metal or the like and provide a very strong yet flexible joint. A further object of the invention is to provide a device wherein the joint is reinforced to provide double strength, and wherein the members forming the device are provided with stops to prevent flexure of the joint in both directions, and wherein said stops form reinforcing members to reinforce the joints and to prevent direct separation of the parts. A further object is to provide certain other new and useful features in the construction and arrangement of parts, all as hereinafter more fully set forth.

With the above and other ends in view, the invention consists in the matters hereinafter set forth and more particularly pointed out in the appended claims, reference being had to the accompanying drawing, in which—

Figure 1 is a perspective view of a device illustrative of an embodiment of the invention and showing the parts separated;

Fig. 2 is a central longitudinal section through the device, with the parts connected and in operative position;

Fig. 3 is an end elevation; and

Fig. 4 is a plan view showing the manner in which the ends of a belt are connected by a pair of devices embodying the invention.

The device as illustrated comprises a pair of wings 1 and 2 formed of sheet metal and each provided with a series of holes 3 through which rivets or the like may be inserted to secure these wings to the adjacent ends of a belt 10. The metal forming these wings is pressed upwardly around the openings 3 to form bosses 4 around the openings, thus strengthening the wings and providing raised seats for the heads of the rivets so that these rivets (not shown in Figs. 1, 2 and 3) may be readily extracted by means of a tool inserted beneath the edges of the head in engagement with the bosses.

Each wing is also formed with a series of eyes 5 by severing the metal inwardly from the end edge thereof and rolling some of the severed strips into round eyes separated by tongues 6 which are also formed in the forming of the eyes, with the strips forming the tongues 6 curved to conform to the curvature of the eyes 5, each tongue lying outside of the plane of the outer surface of the adjacent eyes so that the eyes on one wing will fit into the spaces between the eyes on the other wing with the tongues 6 overlapping and closely embracing the eyes. Each tongue 6 is preferably ribbed as at 7 where it joins the body of the wing and thus each tongue is strengthened and stiffened to prevent bending.

When the eyes 5 on the wing 2 are inserted between the eyes on the wing 1, the tongues 6 on the wing 1 overlie and closely embrace the eyes on the wing 2, and in a like manner the tongues 6 on the wing 2 overlie and closely embrace the eyes on the wing 1. The wings are thus interlocked and may not be separated by a straight pull exerted by the belt by reason of the interlocking of the tongues on one wing with the eyes on the other wing. The joint between the wings is thus reinforced or doubled in strength by this interlocking of the tongues with the eyes, but to insure against the separation of the wings in use, a bolt or pintle 8 is inserted through the eyes on the two wings and made fast in any suitable manner.

In order to prevent crystallization and breaking of this belt connecter, it is desirable that the pivotal connection between the wings be so arranged that they cannot turn, one upon the other, beyond a substantially straight alignment as shown in Figure 2, and it is the tongues 6 which prevent this turning movement of the wings beyond this plane. Therefore in passing around a pulley the connecter may freely turn or flex in one direction but cannot flex or turn in the opposite direction beyond this alignment of one wing with the other, and therefore the life of the connecter is greatly lengthened by preventing relative turning of the wings beyond an aligned position.

Obviously the construction and arrangement may be varied within the scope of the appended claims without departing from the spirit of the invention, and I do not therefore limit myself to the particular construction and arrangement shown.

What I claim is:

1. A device of the character described comprising a pair of wings each formed with a series of spaced apart integral eyes, the eyes on one wing being arranged to fit within the spaces between the eyes on the other wing, and each wing being also formed with a series of integral tongues within the spaces between the eyes with said tongues on each wing curved to conform to the curvature of the outer surface of the eyes on the other wing and closely embrace said eyes, said tongues on each wing serving to reinforce said eyes on the other casing and to prevent the separation of the wings.

2. A belt connecter comprising a pair of wings formed of sheet metal with the metal slitted inwardly from the end edge of each wing, with the severed portion on each wing formed into a series of spaced apart eyes and with tongues opposite the spaces between the eyes, the eyes upon one wing being adapted to fit within the spaces between the eyes on the other wing and beneath the tongues opposite said spaces, said tongues being curved to engage over the eyes and conform closely to the curvature thereof with said tongues of a length less than one-half of the diameter of the eyes to reinforce said eyes and form stops to prevent relative turning movement of the wings beyond longitudinal alignment of the wings.

3. A belt connecter comprising a pair of wings formed of sheet metal each stamped to provide openings for the insertion of means for securing the wings to the ends of a belt and to provide bosses around said openings, each of said wings being also slitted inwardly from their end edges with the severed portions of the metal rolled into a series of spaced apart eyes with tongues opposite the spaces between the eyes curved to conform to the curvature of the outer surface of the eyes and provide stops and means for preventing separation of the wings when the same are interlocked, and a pintle member inserted through the eyes of the two wings.

In testimony whereof I affix my signature.

FRANK SUNDAY.